United States Patent Office 3,595,652
Patented July 27, 1971

3,595,652
DIFFUSION TRANSFER PRODUCT AND PROCESS HAVING SILICEOUS MATERIAL AND OPACITY PROVIDING MATERIAL IN THE EMULSION
Leonard C. Farney, Melrose, Mass., assignor to Polaroid Corporation, Cambridge, Mass.
No Drawing. Filed Jan. 11, 1966, Ser. No. 519,955
Int. Cl. G03c 5/54
U.S. Cl. 96—29                                         20 Claims

ABSTRACT OF THE DISCLOSURE

Photographic product for forming a composite print viewable as a positive reflection print, the product including a light-sensitive silver halide emulsion and a light opacity-providing material in the same layer as the emulsion or in an overlying layer, wherein the layer containing the opacity-providing material further includes a siliceous material.

---

This invention relates to photography and, more particularly, to novel products and processes for preparing visible images by diffusion transfer.

A primary object of this invention is to provide novel film units for preparing images by diffusion transfer.

Another object is to provide novel photographic products and processes for preparing a composite print comprising a positive image in a stratum superposed above a negative image, which composite print is viewable by reflected light as a positive reproduction of the original subject matter.

Other objects of the invention will in part be obvious and will in part appear hereinafter.

The invention accordingly comprises the process involving the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description.

The copending U.S. patent applications of Edwin H. Land, Ser. No. 519,995, filed concurrently as a continuation-in-part of application Ser. No. 368,622, filed May 19, 1964, now abandoned, and Edwin H. Land and Leonard C. Farney, Ser. No. 519,884, filed concurrently as a continuation-in-part of application Ser. No. 368,321, filed May 19, 1964, now abandoned, relate to novel photographic processes and products for preparing visible images by diffusion transfer and, in particular, to the formation of composite prints viewable by reflected light as positive reproductions of the original subject matter.

As is disclosed in these applications a photographic film assembly including a layer containing a light opacity-providing material, e.g., an opacifying material such as titanium dioxide, may be exposed to provide a developable image and thus exposed assembly is then processed to form a negative image and a positive transfer image in a stratum situated above the layer of the material. This material is present in an amount sufficient to mask effectively the negative image but not sufficient to preclude photoexposure of the light-sensitive material in the film assembly, so that there is formed a composite print which contains both a negative and a positive image, but which is viewable by reflection as a positive reproduction of the original subject matter. The opacity-providing material which is preferably a white or substantially colorless substance further serves to provide the background for the positive image. Preferably, this material is present in an amount insufficient to lower, at least to any appreciable extent, the speed of the light-sensitive material which is preferably a mixed silver halide emulsion, e.g., a silver iodobromide emulsion, having a relatively high film speed, as compared, for example, with the speed of silver chloride. In other words, the amount of opacity-providing material is preferably such that the quantum or level exposure required to obtain an image of a desired density is not substantially greater than the amount of exposure required to obtain an image of comparable density from a similar film unit containing no opacity-providing material.

In application Ser. No. 519,995, the layer of light opacity-providing material is situated over a layer containing a light-sensitive silver halide emulsion; while in application Ser. No. 519,884 the material is situated in the same layer as the light-sensitive silver halide emulsion and a second or additional layer of opacity-providing material may also be provided over the layer containing the silver halide emulsion and opacity-providing material.

As was mentioned previously, the light-sensitive material may be a silver emulsion, preferably a mixed silver halide emulsion, having a relatively high film speed. Excellent results have been obtained employed emulsions containing a relatively small amount of silver. Thus, for example, it is disclosed in application Ser. No. 519,995 that the silver halide in the film units described and claimed therein may be present in an amount sufficient to provide a silver coverage on the order of from about 0.02 to about 0.1 g. per sq. ft. surface area; and it is disclosed in application Ser. No. 519,884, that the silver halide present in the single layer film units, i.e., the film units containing no second or additional layer of opacity-providing material, may be present in an amount sufficient to provide a silver coverage as little as 0.0018 g., while in the two-layer film units, i.e., those containing a second layer of opacity-providing material, the silver halide is previously present in an amount sufficient to provide a silver coverage of at least 0.01 g. per sq. ft.

Any of the aforementioned film assemblies may also contain an outer layer comprising a silver-receptive stratum, i.e., a stratum containing at least one silver precipitating agent, or the silver precipitating agent may be present initially in the processing composition.

The processing composition comprises at least an aqueous alkaline solution of a silver halide developing agent and a silver halide solvent. These ingredients may be present initially in the aqueous medium for the processing composition or, alternatively, any or all of the ingredients may be present initially in the film unit, e.g., by encapsulation, as discrete coatings, etc., in which case development is initiated by contacting the film unit with an aqueous medium to form the processing composition. Alternatively, as described in the copending application of Edwin H. Land, Ser. No. 519,885, now Pat. No. 3,362,823, filed concurrently, and now U.S. Pat. No. 3,262,823, development of the exposed film unit may be effected by impregnation with a non-alkaline processing composition and the alkalinity required to initiate development may be generated in situ electrolytically at some time subsequent to impregnation. The processing composition may also contain other reagents such as viscosity-increasing, film-forming material, for example, sodium carboxymethyl cellulose, hydroxyethyl cellulose, etc., preservatives, antifoggants, and the like.

As was mentioned previously, the processing composition may also contain silver precipitating nuclei. Such processing compositions are disclosed, for example, in U.S. Pat. No. 2,662,822, issued to Edwin H. Land. It is also contemplated that the silver precipitating nuclei may be generated in situ electrolytically according to the procedures described and claimed in the copending application of Ronald F. Cieciuch, Ser. No. 519,886 filed concurrently; or a soluble fogging agent may be contained in the processing composition according to the procedures described and claimed in the copending application of Leonard C. Farney, Ser. No. 519,967, filed concurrently.

The present invention is directed to certain improvemenst over the invention described and claimed in the aforementioned patent applications.

It has now been found that the presence of a siliceous material, preferably a finely granulated colloidal silica, in any of the layers of the aforementioned film units containing an opacity-providing material provides certain significant advantages.

For example, the presence of a siliceous material materially lowers the $D_{min.}$ of the resulting positive reproduction. In other words, the siliceous material appreciably enhances the covering power of the opacity-providing material so that the latter more effectively masks the negative image. This makes it possible to employ lesser amounts of opacity-providing material or thinner layers containing the same to obtain positive reproductions having a particular desired $D_{min.}$. Although the exact reason for this enhanced covering power is not clear, it is believed to be at least in part due to the ability of the siliceous material to breakup the agglomerates of the opacity-providing material which tend to form in coating. In other words, it is believed that the siliceous material enhances the covering power by functioning as an aid in coating.

In addition to enhancing the covering power, the presence of the siliceous material makes it possible to obtain increased effectiveness of the silver in the transfer process whereby the positive reproduction is obtained, i.e., it permits one to obtain a positive silver image having a greater $D_{max.}$ with a given amount of silver in the emulsion layer; or, alternatively, a positive silver transfer image having a comparable $D_{max.}$ with lesser amounts of silver. Apart from the obvious economic advantages, the ability to employ relatively small amounts of silver in turn further permits one to obtain positive reproductions having a lower $D_{min.}$ and/or to employ lesser amounts of opacity-providing material to obtain the desired degree of masking of the negative image formed in tht emulsion layer.

Moreover, incorporation of the siliceous material in the emulsion layer may further serve to enhance the shelf life of the film units described and claimed in the aforementioned copending application Ser. No. 519,884, i.e., the film units wherein the emulsion layer contains an opacity-providing material.

A preferred siliceous material is "Cab-O-Sil" (trademark of Godfrey L. Cabot, Inc., for a fire-dry 99% pure fumed silica with a particle size of 0.015 micron, surface area of 200 m.²/g. bulk density of 2.3 lb./cu. ft.). The use of other siliceous materials, e.g., silicates such as magnesium aluminum silicate, will be readily suggested to those skilled in the art in the light of thi description of the present invention.

In general, the amount of siliceous material employed is not critical aed may vary over a wide range. However, particularly good results have been obtained when the ratio by weight of siliceous material to opacity-providing material in the layer is from about 1:3 to about 1:15.

The following examples show by way of illustration and not by way of limitation the practice of this invention.

EXAMPLE 1

In the manner described in the aforementioned application Ser. No. (Case No. 3128), a mixture was prepared comprising the following proportions of ingredients: 200 cc. of water; 0.3 cc. of 25% "Tamol 731" (trademark of Rohm & Haas Co., for an anionic, polymer-type dispersing agent); 61.2 g. of titanium nioxide; 3.75 g. of α-methyl glucoside; 75.0 g. of a 10% gelatin solution; 0.2 cc. of "Triton X–100" (trademark of Rhom & Haas Co., for a nonionic isooctyl phenyl polyethoxy ethanol dispersing agent), and 6.0 g. of silver iodobromide emulsion. This mixture was coated on a paper base support at a rate of about 9.4 g. of coating solution/sq. ft. to provide a layer which upon drying was calculated to contain per sq. ft. of surface area:

|  | G. |
|---|---|
| Titanium dioxide | 1.66 |
| Gelatin | 0.22 |
| Silver | 0.011 |

The resulting film unit was then photoexposed and the thus-exposed unit was processed by applying between the unit and a superposed spreader sheet at a gap of 0.0022" a processing composition containing the following proportions of ingredients:

| | |
|---|---|
| Water cc | 8400.0 |
| Sodium carboxymethyl cellulose (medium viscosity type) g | 450.0 |
| Sodium sulfite g | 675.0 |
| Sodium hydroxide g | 180.0 |
| Potassium thiosulfate g | 207.0 |
| 4-amino-2,6-dimethylphenol g | 180.0 |
| Glycerine cc | 675.0 |
| Benzotriazole g | 36.0 |
| "Tinopol 2BF" (trademark of Geigy Co. for an optical bleach consisting of colorless fluorescent dyes) cc | 60.0 |
| Aqueous solution of sodium sulfide (.0156 g. $Na_2S$/cc.) cc | 9.0 |
| Aqueous solution of lead acetate and cadmium acetate (8.7 g. of lead acetate and 6.3 g. of cadminum acetate/300 cc. of water) cc | 192.0 |

After a 10 second dark time followed by an additional 60 seconds contact time, the spreader sheet was removed to reveal a composite print viewable as a positive silver reproduction having (reflection density) a $D_{min.}$ of 0.16 and a $D_{max.}$ of 0.76.

EXAMPLE 2

Example 1 was repeated, except that the coating mixture contained 8.4 g. of "Cab-O-Sil." This coating mixture was applied at a rate of about 9.1 g. of solution/sq. ft. to provide a calculated coverage of "Cab-O-Sil"/sq. ft. of 0.22 g. Processing in the manner described above provided a composite print viewable as a positive silver image having (reflection density) a $D_{min.}$ of 0.06 and a $D_{max.}$ of 1.10.

EXAMPLE 3

Example 1 was again repated, except that 4.2 g. of "Cab-O-Sil" were added to the coating mixture. This mixture was then applied at a rate of about 9.7 g. of solution/sq. ft. to provide a layer containing per sq. ft., 0.12 g. of "Cab-O-Sil." The resulting composite print was viewable as a positive silver image having (reflection density) a $D_{min.}$ of 0.10 and a $D_{max.}$ of 0.94.

EXAMPLE 4

Example 1 was again repeated except that 12.6 g. of "Cab-O-Sil" were added to the coating mixture. This mixture was then applied at a rate of about 10.6 g. of solution/sq. ft. to provide a film unit containing 0.37 g. of 'Cab-O-Sil" per sq. ft. The resulting composite print was viewable as a positive silver image having (reflection density) a $D_{min.}$ of 0.04 and a $D_{max.}$ of 1.04.

EXAMPLE 5

Example 1 was again repeated adding to the coating mixture 16.8 g. of "Cab-O-Sil." This mixture was then applied at a rate of about 14.0 g. of solution/sq. ft. to provide a film unit containing 0.65 g. of "Cab-O-Sil"/sq. ft. The resulting positive image had a $D_{min.}$ of 0.04 and a $D_{max.}$ of 0.96.

From the foregoing illustrative examples, it will be observed that the siliceous material both raised the $D_{max.}$ and lowered the $D_{min.}$ of the resulting positive reflection print.

The following example was performed to establish clearly that it is the combination of opacity-providing material and siliceous material which provides this increased $D_A$ and not the presence of additional opacity-providing material alone.

EXAMPLE 6

Example 1 was again repeated, except that the coating mixture contained 69.6 g. of titanium dioxide (corresponding by weight to the 61.2 g. of titanium dioxide of Example 1 plus the 8.4 g. of "Cab-O-Sil" of Example 2). This mixture was then applied at a rate of about 8.1 g. of solution/sq. ft. The resulting composite print was viewable as a positive silver reproduction having (reflection density) a $D_{min.}$ of 0.14 and a $D_{max.}$ of 0.90.

It will be noted that the $D_A$ of the positive image of Example 2 was 1.04 and that of Example 6 was 0.76, thus establishing that it is the presence of the siliceous material and not the use of additional opacity-providing material in lieu thereof which provides the aforementioned improved results.

Since certain changes may be made in the above process and product without departing from the scope of the invention herein involved, it is intended that all matter contained in the above description shall be interpreted as illustrative and not in a limiting sense.

What is claimed is:

1. In a photographic product for forming a composite print in which a positive image is formed in a stratum over a negative image, said composite print being viewable as a positive reflection print without separation of said two images, said product including a support, a light-sensitive silver halide emulsion in a layer on said support and a light opacity-providing material in the same layer as said emulsion, said light opacity-providing material being adaptable for masking a silver image formed in said layer by exposing said product and developing said exposed product to form said negative image and a positive transfer image in a stratum above said layer containing said negative image, the amount of said material being insufficient to preclude photoexposure of said silver halide, said material further being capable of providing a background for viewing said composite print by reflected light as a positive image; the improvement which comprises including a siliceous material in said layer containing said emulsion and said light opacity-providing material.

2. A product as defined in claim 1 wherein said siliceous material comprises a finely granulated colloidal silica.

3. A product as defined in claim 1 wherein the ratio by weight of siliceous material to light opacity-providing material is from about 1:3 to about 1:15.

4. A product as defined in claim 3 wherein said emulsion contains a relatively small amount of silver.

5. A photographic product as defined in claim 1 wherein said light opacity-providing material is selected from the group consisting of white and substantially colorless substances.

6. A photographic product as defined in claim 5 wherein said emulsion comprises a mixed silver halide emulsion having a relatively small amount of silver and said product has a relatively high film speed.

7. A photographic product as defined in claim 1 including a silver-receptive stratum above said layer.

8. A photographic product as defined in claim 1 including a second layer containing a light opacity-providing material situated over said emulsion-containing layer.

9. A photographic product as defined in claim 8 wherein said second layer also contains a siliceous material.

10. In a photographic product for forming a composite print in which a positive image is formed in a stratum over a negative image, said composite print being viewable as a positive reflection print without seperation of said two images, said product including a support, a first layer on said support containing a light-sensitive silver halide emulsion, and a second layer positioned over said first layer containing a light opacity-providing material being adaptable for masking a silver image formed in said first layer by exposing said product and developing said exposed product to form said negative image and a positive transfer image in a stratum above said second layer, the amount of said material being insufficient to preclude photoexposure of said silver halide, said material further being capable of providing a background for viewing said composite print by reflected light as a positive image; the improvement which comprises including a siliceous material in said second layer containing said light opacity-providing material.

11. In a photographic product for forming a composite print in which a positive image is formed in a stratum over a negative image, said composite print being viewable as a positive reflection print without separation of said two images, said product including a support, a first layer on said support containing a light-sensitive silver halide emulsion, a second layer positioned over said first layer containing a light opacity-providing material and a silver-receptive stratum over said second layer, said light opacity-providing material in said second layer being adaptable for masking a silver image formed in said first layer by exposing said product and developing said exposed product to form said negative image and to impart a positive transfer image to said silver-receptive stratum above said second layer, the amount of said material being insufficient to preclude photoexposure of said silver halide, said material further being capable of providing a background for viewing said composite print by reflected light as a positive image; the improvement which comprises including a siliceous material in said second layer containing said light opacity-providing material.

12. A photographic product which comprises a support having thereon a layer containing a light-sensitive gelatino silver halide emulsion, titanium dioxide and a siliceous material, said titanium dioxide and said siliceous material cooperating to mask effectively a silver image formed in said layer by exposing said product and developing said exposed product to form a negative image in said layer and a positive transfer image in a stratum above said layer, said two images together comprising a composite print, said titanium dioxide further being capable of providing a background for viewing said composite print by reflected light as a positive image.

13. A photographic product as defined in claim 12 wherein said siliceous material comprises a finely granulated colloidal silica, the ratio by weight of said silica to said titanium dioxide being from 1:3 to about 1:15.

14. A photographic product as defined in claim 12 wherein said emulsion comprises a mixed silver halide emulsion containing a relatively small amount of silver and having a relatively high film speed and said titanium dioxide is present in an amount insufficient to lower said film speed, at least to any appreciable extent.

15. A photographic process comprising the steps of exposing a film unit including a first layer containing a light-sensitive silver halide emulsion and a second layer containing a light opacity providing material and a siliceous material to form a developable image, and contacting said exposed unit with a developing composition to form a composite print comprising a negative image and a positive transfer image in a stratum over said second layer, said composite print being viewable by reflected light as a positive image.

16. In a photographic process comprising exposing a film unit including a support, a light-sensitive silver halide emulsion in a layer on said support, and a light opacity-providing material in the same layer as said emulsion, to form a developable image; applying to said exposed emulsion an aqueous alkaline processing composition containing a silver halide developing agent and a silver halide solvent; reducing exposed silver halide to silver while forming from unexposed silver halide an imagewise distribution of a soluble silver complex; transferring said soluble silver complex, at least in part, to a stratum above said emulsion layer; and reducing said transferred silver complex to form a positive silver image on said stratum, the amount of said opacity-providing material being sufficient to mask effectively said negative image while at the same time providing a background for said positive image formed thereover, thereby providing a composite print viewable by reflected light as a positive silver image; the step which comprises providing a siliceous material in said layer containing said opacity-providing material and said emulsion.

17. A process as defined in claim 16 wherein said siliceous material comprises a finely granulated colloidal silica.

18. A process as defined in claim 17 wherein said processing composition further includes a viscosity-increasing, film-forming material and silver-precipitating nuclei.

19. A process as defined in claim 17 wherein said emulsion comprises a mixed silver halide emulsion having a relatively high film speed and said opacity-providing material is present in an amount insufficient to lower said film speed, at least to any appreciable extent.

20. A process as defined in claim 19 wherein the quantum of exposure of said film unit is not substantially greater than the amount of exposure required to obtain a composite print of comparable density from a similar film unit containing no opacity-providing material.

References Cited

UNITED STATES PATENTS

| | | | |
|---|---|---|---|
| 2,563,342 | 8/1951 | Land | 96—29 |
| 2,616,807 | 11/1952 | Land | 96—29 |
| 2,635,048 | 4/1953 | Land | 96—29 |
| 2,653,527 | 9/1953 | Land | 96—29 |
| 2,662,822 | 12/1953 | Land | 96—29 |
| 2,686,716 | 8/1954 | Land | 96—29 |
| 2,698,237 | 12/1954 | Land | 96—29 |
| 2,740,715 | 4/1956 | Land | 96—29 |
| 2,774,467 | 12/1956 | Land et al. | 96—29 |
| 3,042,514 | 7/1962 | Roth | 96—29 |
| 3,220,837 | 11/1965 | Land et al. | 96—29 |

FOREIGN PATENTS

| | | | |
|---|---|---|---|
| 504,283 | 4/1939 | Great Britain | 96—67 |
| 746,948 | 3/1956 | Great Britain | 96—29 |
| 878,064 | 9/1961 | Great Britain | 96—29 |

OTHER REFERENCES

"Silica Aerogel in Protective Coatings" Canadian Chemistry and Process Industries, May 1945, pp. 374, 376 and 389.

Sveda, "New Silica for Floor Wax," soap and sanitary chemicals, August 1949, 7 pages.

GEORGE F. LESMES, Primary Examiner

J. P. GRAMMER, Primary Examiner

U.S. Cl. X.R.

96—76